(No Model.)
G. M. PIERCE.
CATCH BASIN FOR STREETS.
No. 574,760. Patented Jan. 5, 1897.
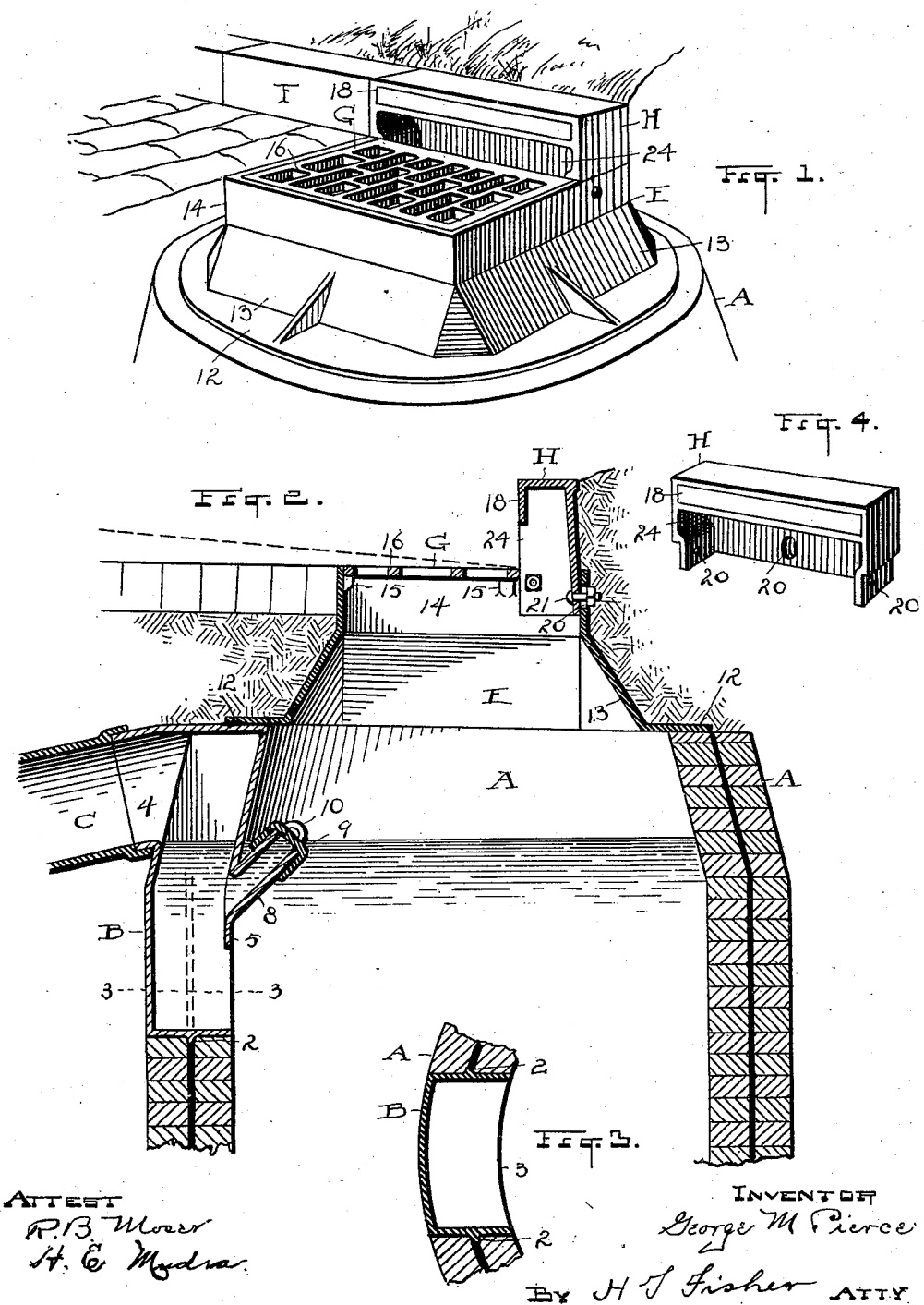

UNITED STATES PATENT OFFICE.

GEORGE M. PIERCE, OF CLEVELAND, OHIO.

CATCH-BASIN FOR STREETS.

SPECIFICATION forming part of Letters Patent No. 574,760, dated January 5, 1897.

Application filed April 20, 1896. Serial No. 588,249. (No model.)

*To all whom it may concern:*

Be it known that I, GEORGE M. PIERCE, a citizen of the United States, residing at Cleveland, in the county of Cuyahoga and State of Ohio, have invented certain new and useful Improvements in Catch-Basins for Streets; and I do hereby declare that the following is a full, clear, and exact description of the invention, which will enable others skilled in the art to which it appertains to make and use the same.

My invention relates to catch-basins for streets; and the invention consists in the construction, combination, and arrangement of parts substantially as shown and described, and particularly pointed out in the claims.

In the accompanying drawings, forming part of this specification, Figure 1 is a perspective view of the surface portion of my improved basin or trap, and Fig. 2 is a vertical sectional elevation of the trap or basin complete and showing it as it appears in use. Fig. 3 is a cross-section of the trap portion proper of the basin on line corresponding to 3 3, Fig. 2. Fig. 4 is a perspective view of the curb-box, as hereinafter described.

A represents the catch-basin, constructed in this instance preferably of brick and of suitable size and depth and is provided at one side at its top with a recess, into which is set the trap proper, B. This trap in this instance is made of cast metal, though it may be of sewer-pipe or other material, and is seated snugly into the recess in the wall A and provided with vertical flanges or ribs 2 at its sides, which take into corresponding grooves in the sides of the wall, and this, with the use of cement, insures a perfectly tight water-joint between said parts. The said trap B has an inlet-opening 3 at its bottom and an outlet 4 at its top, where it discharges into pipe C, and the bottom of the outlet 4 forms the line of water-level in the sink or well, as shown, while the inner wall or diaphragm 5 of the trap, which dips into the water down to the upper level of opening 3, forms a water seal or barrier for the back action of the gas from the sewer, effectually preventing the escape of sewer-gas through the trap into the street.

Sometimes it occurs that the trap becomes so obstructed with leaves and other floating matter that the outlet is entirely closed and the basin fills bodily full of water. In such cases there would be much inconvenience to get the rubbish removed from the outlet and the trap restored to working condition if some provision were not made to meet such an emergency. Usually there is no way but to draw off the water by buckets or the like from the top, but I provide an inclined tubular projection 8 on the inside of trap B, which has its mouth on the water-level in normal conditions and is covered by a cap 9, leaving a loop 10 on its top. The projection 8 is in line with the street-opening, which is covered by grate G above and opens into the trap, where obstructions will accumulate and bar the passage if such obstruction should occur. Hence in such cases I have simply to insert a suitable instrument, like a rod with a hook on its end, and remove cap 9, and then there is afforded not only a temporary outlet for the water down to the normal water-level, but an opening through which an instrument can be inserted to dislodge the obstructions and cause them to be carried off with the outflowing water, thus relieving the trap without other or further labor. This being done, the cap 9 is again restored and the trap is ready for use.

The basin or well A is surmounted by a cover E, having a flanged base 12, which rests on the top of the basin and on the trap-case B and is designed to come flush with the surface of the pavement at the curb F and to have the pavement built over and about the same, substantially as shown. Among other things it is desirable that this part E should be proof against the lifting action of frost, being necessarily within the frost limits of the more northerly latitudes, and to this end it is fashioned with converging or inwardly and upwardly inclined sides 13 above the base-flange 12 and terminating in the neck 14 about its top and around which the paving stones or brick or other surface-paving is placed. The flange 12 and the inclined body 13 of the said cover or top part E of the basin having the pavement over and about the same, as shown, resists all frost action and remains always in place.

The grate G occupies the main portion of the top opening in the cover or cap E and rests on lugs 15 or their equivalent on the inside of the said cover and is flush with the top thereof and the pavement. One peculiar and novel feature of this grate is that the bars 16, which run parallel with the curb, are staggered, so as to break the continuity and the tendency of the water to flow over the said bars across the opening, as always occurs when the bars run clear across the grate, but by breaking the connection after the manner here shown the flow of the water will be interrupted at the second cross-bar 16 on both sides, and the discharge of the water will be more prompt and rapid than with the old style of grate. There is also less liability of clogging with leaves, straw, and the like than before.

H represents the curb-box. This box also occupies space within the neck of the cover E, but is located at the rear of the grate G and in line with the curb F on its front vertical edge 18. Referring to Fig. 4, it will be seen that said box is provided with oblong bolt-holes 20, through which it is secured by bolts 21 to the said cover. The holes 20 and bolts 21 or their equivalent are used to secure the said box adjustably to the said cover E, the height and the inclination of the curb F being matters which necessarily are considered in a properly-constructed catch-basin. In some cities a materially higher curb is used than in others, and in some the face of the curb is vertical, while in others it is set at a decided inclination. Hence the box H not only should be a separate part, but its means of support and fastening should be such as to enable it to be readily accommodated to any elevation or inclination of curb. The construction here shown has this adaptability.

Another important feature of the box H is its full-width opening 24 along its front and bottom, this opening being combined with a grate G over the cover E in front of said box. Hitherto the box H has been barred or grated substantially like the grate D, but this was objectionable because in case there was debris or trash enough afloat to close the grate G it would almost certainly also close the side grate, and thus the trap would be rendered worthless, but by having an open box, as shown, leaves, straw, and the like cannot obstruct it, and so an ever-ready and reliable overflow is afforded for the basin. For ordinary purposes the grate is sufficient, but for extraordinary occasions and especially in heavy floods with much light matter afloat the open passage 24 is indispensable.

Attention is now called to a material point of difference and improvement in the foregoing construction over anything known to me in this art. It will be noticed, for example, that the body of the catch-basin is built in suitable masonry, brick being preferred. The wall of this body forms a rest or support for the "flanged cover," so called, or upper member E of the basin. Now it is well known that in different cities the streets have different pitch or inclination from center to side, and that there is considerable variation, depending on the character of the pavement, the grade of the street, and other local conditions. Hence in putting in these street appliances there should be room within the appliance itself to accommodate itself to these varying needs and ability to meet them promptly and efficiently. The advantage and value of a substructure such as I use will therefore be apparent, because I can and do build the wall A up to a finish with such relative inclination on top for the part E as the street may require. For example, in Fig. 2 particularly it will be seen that the inclinations of the top of part E and the grate G thereon correspond exactly to the lateral inclination or contour of the surface of the street, while at the same time part E rests on the flat top surface of the wall built with its top to the inclination required. This leaves part E free to be set and arranged on the ground according to the then present requirements, and renders the device variously adaptable and gives it advantage and value which it could not have if it did not possess this novelty. In this construction at least the top portion of the body A should be in masonry, so as to adapt it to use in this way.

What I claim as new, and desire to secure by Letters Patent, is—

1. The basin and the cover therefor having an opening down through its top, a grate over the front part of said opening and a curb-box over the rear part thereof, and said cover and box constructed to adjust the box to different inclinations and elevations in relation to the cover, substantially as described.

2. The catch-basin having a body of masonry and a cover therefor with a central water-passage, a grate over the front portion of said passage and a curb-box in a separate piece over the rear portion thereof, said box having an unobstructed opening in its side into the basin the full width of said grate, and closed across its top and means to adjust said box separately to the inclination of the covering, substantially as described.

3. The basin-wall having a recess in its top and vertical grooves in the sides of said recess, in combination with the trap-frame set into said recess and having vertical flanges at its sides fitting in said grooves, thereby making a water-tight joint between said parts, substantially as described.

Witness my hand to the foregoing specification on this 11th day of April, 1896.

GEORGE M. PIERCE.

Witnesses:
H. T. FISHER,
R. B. MOSER.